(No Model.)

R. H. WIDDICOMBE.
TERMINAL FOR ELECTRIC CABLES.

No. 367,734. Patented Aug. 2, 1887.

Witnesses.
Saml. B. Dover.
Leopold Stern.

Inventor:
Robert H. Widdicombe
By George P. Barton
Att'y.

UNITED STATES PATENT OFFICE.

ROBERT H. WIDDICOMBE, OF CHICAGO, ILLINOIS, ASSIGNOR TO THE WESTERN ELECTRIC COMPANY, OF SAME PLACE.

TERMINAL FOR ELECTRIC CABLES.

SPECIFICATION forming part of Letters Patent No. 367,734, dated August 2, 1887.

Application filed August 16, 1886. Serial No. 210,969. (No model.)

*To all whom it may concern:*

Be it known that I, ROBERT H. WIDDICOMBE, a citizen of the United States, residing at Chicago, in the county of Cook and State of Illinois, have invented a certain new and useful Improvement in Terminals for Electric Cables, of which the following is a full, clear, concise, and exact description, reference being had to the accompanying drawings, forming a part of this specification.

My invention relates to terminals for electric-telegraph cables; and its object is to furnish facilities for distributing the wires at the end of the cable, while moisture is prevented from penetrating to the conductors.

My invention consists in an air-tight metallic box through which binding-posts are inserted and separately insulated, the conductors of the cable being connected inside the box with their different binding-posts respectively. The back or front of the box is made removable, so that the interior of the box may be accessible. I preferably provide a hole in the top and in the bottom of the box, so that the interior may be dried out by pouring through the box melted paraffine. These holes may be closed by means of plugs. The end of the cable is inserted in the box from below, the lead pipe of the cable being secured to the nipple of the box by a wipe-joint.

Figure 1:
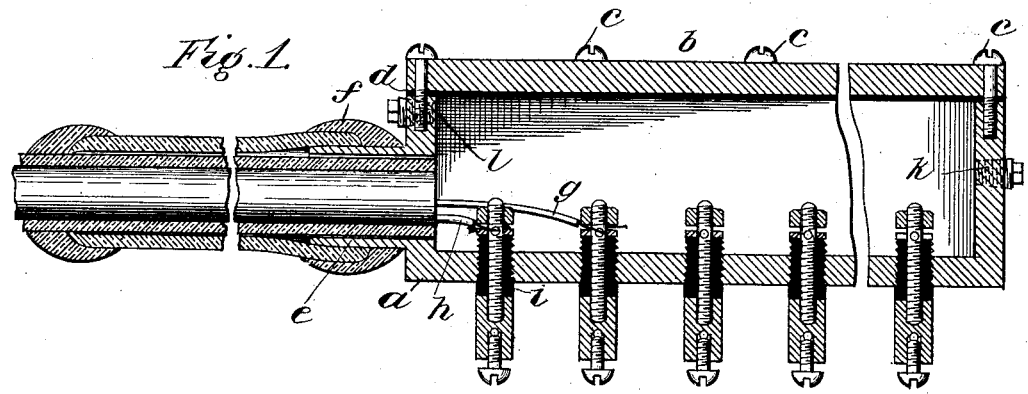
Figure 2:
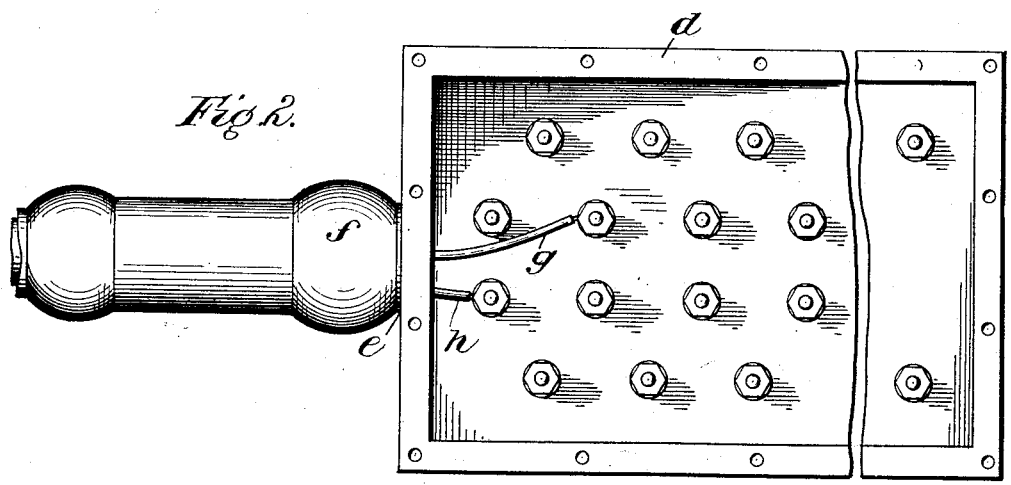
Figure 3:
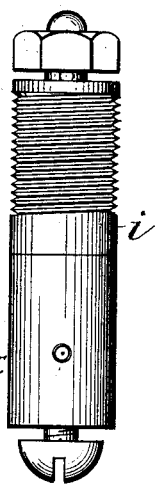
Figure 4:
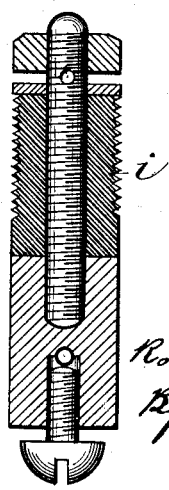

In the drawings, Fig. 1 is a sectional view of my cable terminal. Fig. 2 is a rear view thereof with the cover removed. Fig. 3 is an elevation of a binding-post and the rubber bushing for insulating the same. Fig. 4 is a sectional view thereof.

Like parts are indicated by similar letters of reference in the different figures.

The frame or body $a$ of the box may be of brass or iron. The back $b$ consists of a separate piece, which is secured to the body of the box by screw $c$, the joint between the back and the edge of the frame being made tight by means of packing $d$. Instead of making the back removable, I have sometimes made the front or face of the box which carries the binding-posts separate from the main body of the box, the front being secured to the frame as heretofore described with respect to the back. In either case the binding-posts are arranged at right angles to the direction of the wires as they come from the cable. The box is made rectangular and long enough to hold on one side or face as many binding-posts as there are conductors in the cable. The connections of the wires with the binding-posts are thus made readily accessible.

The nipple $e$ is preferably provided at the lower end of the box, and the lead pipe of the cable is secured thereto by means of a wipe-joint, $f$, as shown. The cable may be provided with any suitable number of conductors $g\ h$. I have for clearness illustrated only two conductors with their respective binding-posts upon the interior of the box. The other conductors of the cable should be in like manner connected with their respective binding-posts. After all are connected the box is sealed up. The end of the cable is thus protected by an air-tight chamber, so that no moisture can penetrate to the core.

Connection may be made with the different wires at the binding-posts outside the box. The bushing $i$ about the binding-posts may consist of hard rubber or other insulating material.

The bushings are preferably covered with shellac before they are screwed into the holes in the box. Shellac is also applied to the screws of the binding-posts before they are inserted in the bushings respectively. The interior of the box when closed is thus made absolutely air-tight and water-proof. Ordinarily the wires are connected with the binding-posts of the terminal after the splices are all made.

In case it is found necessary to splice the cable after the wires are connected at the terminals, the numbering and arrangement of the wires outside the terminals may be kept intact by connecting the wires of the cable with the proper binding-posts. In order that this may be conveniently done I preferably leave sufficient slack in the conductors inside the terminals, so that any conductor may be connected to any one of the binding-posts therein.

When it is desired to dry out the box after it has been opened for any purpose, the plugs $k\ l$ are removed and then melted paraffine is poured through until the interior is thoroughly dried. The plugs are then again inserted.

The box as thus constructed is thoroughly air-tight and water-proof, and if by any accident moisture should find its way into the interior it may be readily dried out as described.

Having thus described my invention, I claim as new and desire to secure by Letters Patent—

The combination, with the lead pipe of a telegraph-cable and the core of separately insulated conductors, of a metallic box united with the end of the lead pipe and provided with binding-posts inserted through the box, said box being rectangular and provided with binding-posts arranged upon one face of the box, and an opposite removable face for affording access to the interior connections, and when closed forming an air-tight and water-proof chamber at the end of the core, whereby the core may be protected from moisture while connection may be made with the different wires at the binding-posts outside the box, substantially as shown and described.

In witness whereof I hereunto subscribe my name this 2d day of August, A. D. 1886.

R. H. WIDDICOMBE.

Witnesses:
H. B. THAYER,
W. J. ARMSTRONG.